(12) United States Patent
Santana-Gallego et al.

(10) Patent No.: US 9,745,065 B2
(45) Date of Patent: Aug. 29, 2017

(54) DEVICE FOR PROTECTING AN INDIVIDUAL SITTING ON A SEAT, A SEAT, AND A VEHICLE

(71) Applicants: AIRBUS HELICOPTERS, Marignane, Cedex (FR); AIRBUS HELICOPTERS DEUTSCHLAND GMBH, Donauworth (DE); SCHROTH SAFETY PRODUCTS GMBH, Arnsberg (DE)

(72) Inventors: Tomas Santana-Gallego, Aix En Provence (FR); Ulf Gruene, Ense (DE)

(73) Assignees: AIRBUS HELICOPTERS (FR); AIRBUS HELICOPTERS DEUTSCHLAND GMBH (DE); SCHROTH SAFETY PRODUCTS GMBH (DE)

( * ) Notice: Subject to any disclaimer, the term of this patent is extended or adjusted under 35 U.S.C. 154(b) by 283 days.

(21) Appl. No.: 14/641,498

(22) Filed: Mar. 9, 2015

(65) Prior Publication Data

US 2015/0259071 A1  Sep. 17, 2015

(30) Foreign Application Priority Data

Mar. 11, 2014 (EP) ..................... 14290061

(51) Int. Cl.
*B64D 11/06* (2006.01)
*B64D 25/06* (2006.01)
(Continued)

(52) U.S. Cl.
CPC .......... *B64D 11/0621* (2014.12); *B60R 21/18* (2013.01); *B60R 21/233* (2013.01);
(Continued)

(58) Field of Classification Search
CPC ..... B60R 21/18; B60R 21/233; B60R 21/261; B60R 2021/0093; B60R 2021/23308;
(Continued)

(56) References Cited

U.S. PATENT DOCUMENTS 3,883,053 A * 5/1975 Pritchard .................. A45F 3/12
2/459
6,237,945 B1 5/2001 Aboud et al.
(Continued)

FOREIGN PATENT DOCUMENTS

| EP | 2604479 | 6/2013 |
|---|---|---|
| EP | 2666676 | 11/2013 |
| EP | 2671802 | 12/2013 |
| JP | H0966789 | 3/1997 |
| JP | 11342217 A | * 12/1999 |
| JP | 2006081746 A | * 3/2006 |

OTHER PUBLICATIONS

European Search Report for EP 14290061, Completed by the European Patent Office on Oct. 29, 2014, 5 Pages.

*Primary Examiner* — Laura Freedman
(74) *Attorney, Agent, or Firm* — Brooks Kushman P.C.

(57) ABSTRACT

A protection device having a set of inflatable protection members including a neck airbag, a left lower airbag, a left upper airbag, a right lower airbag, and a right upper airbag. The protection device has a lower pocket provided with a lower base forming the neck airbag and two lower lateral branches forming the left lower airbag and the right lower airbag. An upper pocket at least partially secured to the lower pocket is provided with an upper base forming a head airbag and two upper lateral branches forming the left upper airbag and the right upper airbag. At least one longitudinal internal wall provide at least two "tubes" in each upper airbag, the upper pocket being in fluid flow communication with the lower pocket.

22 Claims, 5 Drawing Sheets

(51) Int. Cl.
*B60R 21/18* (2006.01)
*B60R 21/233* (2006.01)
*B60R 21/261* (2011.01)
*B60R 21/00* (2006.01)
*B60R 22/02* (2006.01)

(52) U.S. Cl.
CPC ............ *B60R 21/261* (2013.01); *B64D 11/06* (2013.01); *B64D 11/062* (2014.12); *B64D 11/06205* (2014.12); *B64D 25/06* (2013.01); *B60R 2021/0093* (2013.01); *B60R 2021/23308* (2013.01); *B60R 2022/027* (2013.01)

(58) Field of Classification Search
CPC ............ B60R 2022/027; B64D 11/062; B64D 11/06205; B64D 11/0621; B64D 25/06; A41D 13/0007; A41D 13/018; A62B 35/0006; A62B 35/0012; A62B 35/04
See application file for complete search history.

(56) References Cited

U.S. PATENT DOCUMENTS

| | | | |
|---|---|---|---|
| 8,016,318 B2* | 9/2011 | Nezaki | B60N 2/002 280/733 |
| 8,038,170 B2* | 10/2011 | Haraoka | B60R 21/18 244/122 AG |
| 8,365,316 B2* | 2/2013 | Jan | A41D 13/018 2/102 |
| 8,864,168 B2* | 10/2014 | Ichida | B60R 21/18 280/733 |
| 2013/0147242 A1* | 6/2013 | Santana-Gallego | B60R 21/23138 297/216.12 |
| 2016/0250987 A1* | 9/2016 | Okubo | B60R 21/18 |

* cited by examiner

DEVICE FOR PROTECTING AN INDIVIDUAL SITTING ON A SEAT, A SEAT, AND A VEHICLE

CROSS REFERENCE TO RELATED APPLICATION

This application claims priority to European patent application No. EP 14 290061.2 filed on Mar. 11, 2014, the disclosure of which is incorporated in its entirety by reference herein.

BACKGROUND OF THE INVENTION (1) Field of the Invention

The present invention relates to a protection device for protecting an individual sitting on a seat, to a seat, and to a vehicle. More particularly, the invention relates to a device for protecting and restraining a passenger in an aircraft.

(2) Description of Related Art

In order to improve the safety of a passenger in a vehicle, it is known to use protection devices implementing a restraint harness for holding an individual against a seat. Such a restraint harness is sometimes referred to as a "safety belt".

The restraint harness comprises straps, preferably retractable straps that are attached to the vehicle at at least three points.

On aircraft, it is common practice to provide harnesses with four or five attachment points and including in particular left and right shoulder straps that are attached to a buckle.

In addition, it is also known to use inflatable protection devices including inflatable cushions known as "airbags".

Document EP 2 604 479 describes a device for protecting an individual held on a seat with the help of a harness having a left shoulder strap and a right shoulder strap. The protection device has a set of inflatable protection members including left inflatable lateral means and right inflatable lateral means suitable for co-operating respectively with the left shoulder strap and with the right shoulder strap. The protection device has an inflator for inflating the inflatable protection members.

In addition, in said set of inflatable members, the protection device has a headrest carrying an airbag for the nape of the neck named "neck airbag", that neck airbag including one passage per inflatable lateral means for conveying fluid to each inflatable lateral means, said headrest being provided with a hollow support carrying said inflator and with a fluid diffusion box arranged in the neck airbag in order to convey a fluid from the inflator to the neck airbag and to the inflatable lateral means.

Each inflatable lateral means may include both a lower airbag provided with a single lower container, and also an upper airbag provided with two upper containers.

The protection device may include slider means for each inflatable lateral means in order to accommodate relative movement between the inflatable lateral means and a shoulder strap co-operating with the inflatable lateral means, each slider means being secured to respective inflatable lateral means.

Those slider means may be attached via a breakable section to the headrest, and possibly also to a rotary connection.

Also known is document U.S. Pat. No. 6,237,945.

Document EP 2 671 802 discloses a protection system having an upper and, optionally, a lower airbag and further comprising a restraint means for laterally retaining the walls of the airbag(s).

Document EP 2 666 676 describes a protection apparatus comprising an airbag which is internally divided to form various inflatable portions.

Document JP H09 66789 A discloses a wear-type airbag comprising a bag-like structure and an inflator in turn having a gas generator that can be activated by exposing means.

BRIEF SUMMARY OF THE INVENTION

An object of the present invention is thus to propose an alternative protection device.

Thus, the invention provides a protection device for protecting an individual held on a seat with the help of a harness that has a left shoulder strap and a right shoulder strap. The protection device has a set of inflatable protection members including a neck airbag and left inflatable lateral means and right inflatable lateral means, the left inflatable lateral means having a left lower airbag and a left upper airbag, the right inflatable lateral means having a right lower airbag and a right upper airbag, each upper airbag overlying a lower airbag in an elevation direction. An elevation direction refers to a direction going away from an individual on the seat and passing through the protection members.

The protection device comprises:

a C-shaped inflatable lower pocket provided with a lower base forming said neck airbag and two lower lateral branches respectively forming said left lower airbag and said right lower airbag for positioning on the chest of an individual, said lower base including an orifice for admitting an inflation fluid; and a C-shaped inflatable upper pocket provided with an upper base forming a head airbag and two upper lateral branches extending longitudinally and forming respectively said left upper airbag and said right upper airbag, each upper lateral branch having at least one longitudinal internal wall so as to provide at least two "tubes" in each upper airbag, said upper pocket being in fluid flow communication with said lower pocket, said upper pocket being secured at least in part to said lower pocket, each upper airbag of an inflatable lateral means being secured at least in part to the lower airbag of said inflatable lateral means.

The longitudinal internal walls define in each upper airbag some tubes, the number of tubes being equal to the number of internal wall plus one. In an embodiment, each upper lateral branch has two longitudinal internal walls so as to provide three "tubes" in each upper airbag.

Under such circumstances, the protection device of the invention provides inflatable lateral means each provided with a lower airbag defining one "tube" and an upper airbag defining at least two "tubes". By way of example, these at least two tubes are in fluid flow communication, in particular via the upper base.

During an emergency landing or a crash, fluid is blown into the lower pocket in order to inflate the neck airbag. This fluid then reaches the lower airbags in order to inflate them. In addition, the fluid moves from the lower pocket towards the upper pocket in order to inflate the head airbag and the upper airbags.

The different airbags of the protection device are then inflated in order to protect an individual sitting on a seat.

The individual may be subjected to forces in many directions, particularly on board a rotorcraft. In particular, the individual's head and chest may be moved.

The configuration of the protection device, in particular the use of upper airbags presenting at least two adjacent "tubes" and the link of each upper airbag to a lower airbag by a common wall serves to limit any risk of the corresponding lower airbag deforming.

Following a lateral or a frontal movement, an individual's chest may impact against a lower airbag. If the lower airbag is easily compressed as a result of such an impact, the individual's head end/or chest are not fully restrained.

The invention tends to limit the appearance of such a situation. The presence of the internal walls tends to increase the forces needed for deforming the lower airbag. The individual's head and chest can then be more firmly restraint in correct position.

Furthermore, the C-shape of the upper and lower pockets makes it possible to use lower airbags that connect each other once inflated and/or upper airbags that connect each other once inflated while making a neck passage for passing the individual's neck. Each of these upper and lower bases then defines a substantially oblong orifice to avoid compressing the individual's neck after the various airbags have inflated.

This characteristic also tends to limit the ability of a head to move forward.

In addition, each inflatable lateral means may only push after inflation an individual's chest in order to avoid tending to push the individual down onto the seat.

The protection device may also include one or more of the following characteristics.

Thus, said upper base may be in fluid flow communication with said lower base.

Each base may then have a through section for communicating with the other base so as to enable the airbags of the upper pocket to be inflated.

In a first embodiment, the upper pocket and the lower pocket have a common wall separating them in elevation on going away from an individual.

In a second embodiment, the lower pocket has a lower wall and the upper pocket has an upper wall, the lower wall being secured in part to the upper wall by means of two joint areas per inflatable lateral means. The protection device further comprises a left path and a right path being provided respectively between the left lower airbag and the left upper airbag and between the right lower airbag and the right upper airbag in order to enable said shoulder straps to pass. The left path is defined between the two joint areas of the left inflatable lateral means and the right path is defined between the two joint areas of the right inflatable lateral means.

This configuration, together with the provision of at least two longitudinal tubes—as a result of the presence of a longitudinal internal wall—in each one of the left and right upper airbags, allows for a limitation of the risk of deformation of the corresponding lower airbag in the event that, when there is an impact of considerable magnitude, the upper airbag did not succeed in completely absorbing the impact and an individual's chest or head ended up hitting the lower airbag. In other words, the fact that each inflatable lateral means has two contact areas between the lower and the upper airbag enhances the technical effect of the feature of the left and right upper airbags having longitudinal internal walls.

The lower and upper pockets may be manufactured separately. The lower pocket is then attached to the upper pocket, e.g. by stitching. The stitching may be in the form of sealed stitching. This second embodiment tends to make it easier to fabricate the protection device.

Furthermore, the lower pocket may have a left slot in elevation and a right slot in elevation for the shoulder straps to pass through.

Each shoulder strap thus runs within the protection device between the upper pocket and the lower pocket. More precisely, each shoulder strap is interposed solely between an upper airbag and a lower airbag of respective inflatable lateral means, and then passes through the lower pocket in order to pass under the neck airbag.

This arrangement makes it easier in particular to position the lower airbags on an individual's chest, and not on the superior parts of the individual's shoulders. This positioning of the lower airbags presents the advantage of avoiding or at least limiting the application of vertical forces tending to press an individual down onto the seat.

Furthermore, said lower base may include a non-inflatable central zone and an O-shaped inflatable peripheral zone surrounding said non-inflatable zone.

A fluid may be conveyed through the lower base in a first transverse direction in order to avoid impacting directly against an individual's neck or on the rear part the individual's head. The non-inflatable zone serves to direct the fluid in preferred directions.

In addition, using a non-inflatable central zone tends to limit any risk of the neck airbag deploying in a longitudinal direction acting towards the individual's neck.

The non-inflatable zone may optionally be closed by a fabric in order to avoid presenting an orifice. This configuration seeks to avoid an individual exerting forces on the protection device by putting a hand into such an orifice, for example.

Furthermore, the protection device may include a headrest secured to said lower base. Such a headrest may also carry the straps of the harness, and may be movable in elevation in order to adapt to the morphology of a given individual.

The protection device may then include a C-shaped holder bar crossing the non-inflatable zone and being attached to the headrest, surrounding the peripheral zone.

The holder bar seeks to avoid the lower pocket tearing.

At the beginning of inflation, the airbags are all folded. Under such circumstances, the fluid conveyed into the lower pocket exerts a high level of pressure against the lower pocket. The holder bar serves to limit the extension of the volume of the lower base. The forces exerted on the lower pocket are then smaller.

The protection device may include slider means for each inflatable lateral means passing at least in part between the lower pocket and the upper pocket in order to join attachment means for attaching to a seat.

Slider means tend to allow relative movement between the inflatable lateral means and a shoulder strap co-operating with the inflatable lateral means. By way of example, each slider means may be secured to corresponding inflatable lateral means by being jammed between the lower airbag and the upper airbag. The lower airbag is then in contact with the chest of the individual sitting on the seat when the lower airbag is deployed.

Each slider means may also be attached to corresponding inflatable lateral means. For example, slider means may be stitched to the upper airbag and/or to the lower airbag of corresponding inflatable lateral means.

In addition, or as an alternative, slider means may be attached to the upper airbag and/or to the lower airbag of inflatable lateral means by reversible attachment means. For example, two strips each covered in different fabrics serve to obtain a releasable connection when those two strips are put into contact. One of the strips may have hooks while the other strip is in the form of a fabric carrying loops.

Furthermore, the slider means have a shoulder strap passing therethrough. Consequently, a shoulder strap can slide through slider means.

As a result, when the individual sits on the seat, it is possible to pull on the shoulder straps in order to attach them to a buckle without that causing the inflatable lateral means arranged on the shoulder straps to move. The inflatable lateral means then remain in the required position.

The individual may also move forwards without being impeded in such movements.

By way of example, such slider means may include a base carrying at least two guides suitable for having a shoulder strap passing therethrough. The base may be secured to the airbags of the corresponding inflatable lateral means and/or to the envelope and/or to a seat, where appropriate.

Furthermore, the protection device may have a left rotary connection and a right rotary connection with the respective left and right shoulder straps passing through them to allow a rotation of the shoulder straps around at least one direction.

For example, the protection device may have a left spherical connection and a right spherical connection with the respective left and right shoulder straps passing through them.

By way of example, each slider means may then be attached to the headrest via a breakable section, e.g. a breakable section of a rotary connection. The slider means may also include a base provided with a breakable section.

When an individual's chest moves forwards under the effect of inertia forces, the individual exerts force on the protection device that lead to the breakable section breaking. The airbags then move with the individual, each inflatable lateral means advantageously being in contact with the individual's chest.

Nevertheless, the protection device may include at least one tie secured to said upper and lower pockets, said protection device including direct or indirect attachment means for attaching the tie to a seat in order to limit forward movement of the chest of an individual in contact with the protection device.

The protection device may have a tie for each inflatable lateral means and/or at least one tie for each lower and upper pocket.

By way of example, the attachment means may be a conventional member for attaching to a seat, or may comprise slider means and a cable connecting the slider means to the seat. Under such circumstances, each tie extends between a lower or upper pocket and a seat, or between a lower or upper pocket and slider means.

In the event of a breakable section breaking while an individual is being thrown forwards, each tie tends to limit the movement of the associated lower or upper pocket.

More precisely, a tie may be attached to a layer of a lower or upper pocket in order to limit the deformation of the pocket during the forwarded movement of an individual, thereby optimizing the operation of the protection device.

For example, the lower pocket may be defined in elevation by two layers of material, namely a layer in contact with an individual and a layer in contact with slider means. The forward movement of an individual may give rise to relative movement between these two layers. A tie may tend to minimize such relative movement.

Furthermore, such a tie may include at least one loop closed by at least one stitching zone suitable for breaking under a predetermined traction force. The length of the tie may then vary as a function of the morphology of an individual and of the force generated by the forward movements of an individual's torso in order to adapt the positioning of the inflatable lateral means.

Furthermore, each inflatable lateral means may extend longitudinally from the neck airbag and the head airbag towards a free end, and each inflatable lateral means may have a thickness that decreases going from the neck airbag and the head airbag towards said free end when the lateral means are inflated.

Each inflatable lateral means thus includes a top section bearing against a top portion of an individual's chest. This top section presents a thickness that is greater than a thickness of the bottom section of the inflatable lateral means that bears against a bottom portion of the individual's chest.

An individual's pelvis is held by a belt of the harness which means that the individual's back bends forwards during a crash. The axis of rotation of this movement is level with the pelvis, so the individual presses against the shoulder strap more strongly at the top of the chest than at the bottom of the chest. Under such circumstances, in order to optimize restraint with the help of the airbags, it is advantageous for them to present the above-mentioned varying thickness.

In addition, each upper airbag may include a peripheral partition having a height greater than the height of said internal walls.

Consequently, if the upper airbags are provided with at least three tubes, each upper airbag may present two peripheral "tubes" on either side of at least a central "tube". Each central "tube" may then present a volume that is smaller than the peripheral "tubes". This characteristic tends to optimize the pressure that exists in the upper airbag and the pretension that is exerted by the protection device on a shoulder strap.

Furthermore, the protection device may include an inflator and a distributor, the distributor being arranged in the lower base, the distributor including a projecting means for projecting fluid into said base along a transverse direction.

In addition, the set of inflatable protection members may be folded inside an envelope having a zone of weakness to enable the inflatable protection members to be deployed, the envelope having a lower segment resting on an individual while in use, and an upper segment that does not rest on an individual when the airbags are not inflated, the lower segment having a surface with a low coefficient of friction and the upper segment having a surface with a high coefficient of friction that comes into contact with an individual when the airbags are inflated.

The envelope may be attached to a seat, and/or to slider means, and/or to an airbag.

The envelope is thus interposed between an individual's body and the airbags of the protection device.

When the airbags are not inflated, the airbags are folded inside the envelope.

Under such conditions, if an occupant seeks to lean forwards, that movement may be impeded by forces resulting from friction between the individual and the envelope. The invention thus proposes providing the envelope with a lower segment having a low coefficient of friction in order to limit this difficulty. Nevertheless, such a low coefficient of friction can be a drawback when the airbags are inflated.

Under such circumstances, when the airbags are inflated, the upper segment of the envelope is also pressed in part against the individual as a result of the airbags being deployed. This upper segment then has a high coefficient of friction in order to avoid excessive relative movement between the individual and the protection device.

In addition, when the set of inflatable protection members is folded inside an envelope having a zone of weakness to enable the inflatable protection members to be deployed, the zone of weakness may be directed towards the head of an individual, while it is in use, so long as the airbags are not inflated.

The inflation of the airbags then causes the envelope to break in a preferred direction so as to avoid disagreeable contact between the envelope and the individual's head.

Furthermore, said protection device may have a C-shaped inflatable head collar attached to the upper pocket in order to surround the head of an individual without obstructing vision of said individual, said head collar being in fluid flow communication with the upper pocket.

The head collar is placed on top of the upper pocket in order to protect the individual's head while reducing the head's freedom of movement and creating a barrier between the head and any obstacle.

The head collar may include a fluid pressure release valve in order to prevent the collar exploding and in order to improve energy absorption in the event of an impact against an obstacle. Breakable stitching may also be provided for this purpose.

In an embodiment:

said inflatable upper pocket has an inflatable upper space defined by a first layer, a second layer, and a first partition in elevation between said first and second layers for each upper lateral branch, each first partition being attached to the first layer and to the second layer, the first layer being above the second layer, each upper lateral branch having at least one longitudinal internal wall each attached to the first layer and to the second layer; and said inflatable lower pocket has an inflatable lower space defined by a third layer, a fourth layer, and a second partition in elevation between said third and fourth layers for each lower lateral branch, each second partition being attached to the third layer and to the fourth layer, the third layer being above the fourth layer and being attached at least in part to the second layer.

This embodiment suggests manufacturing the protection device with the help of four layers connected together by partitions and stitching, for example. Such stitching may be sealed so as to avoid or at least limit outward leakage and optimize the inflation of the airbags.

Optionally, at least one of said first, second, third and fourth layers includes flanks forming a partition in elevation between layers. Such a layer may be manufactured with the help of two walls attached to each other by a deformable portion.

A partition between layers of a lower or upper pocket may be obtained with the help either of a partition in elevation stitched to the corresponding layers, or else with the help of flanks of one layer stitched to the other layer.

Furthermore, at least one lower or upper pocket may include two transverse projections from its lateral arms in order to optimize the distribution of fluid during inflation. These projections serve to optimize a fluid flow section for limiting any risk of a pocket tearing during inflation.

Furthermore, the invention provides an aircraft including such a device for protecting an individual.

BRIEF DESCRIPTION OF THE SEVERAL VIEWS OF THE DRAWINGS

The invention and its advantages appear in greater detail in the context of the following description of examples given by way of illustration and with reference to the accompanying figures, in which.

DETAILED DESCRIPTION OF THE INVENTION

Elements shown in more than one of the figures keep the same references in each of them.

Figure 1:
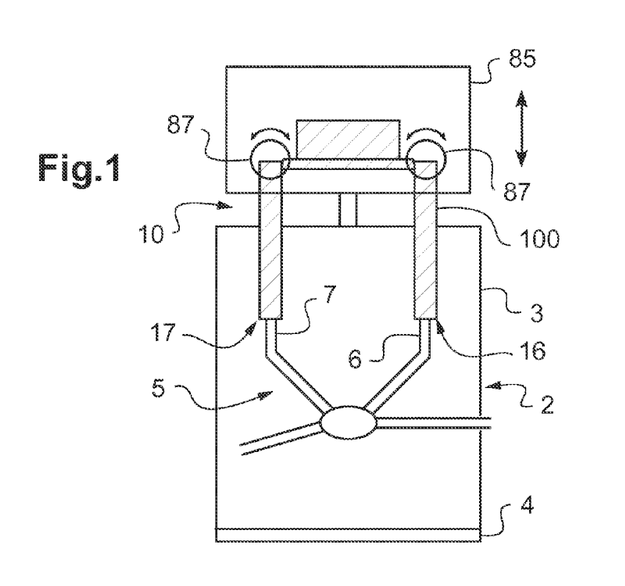
FIG. 1 is a diagram of a harness provided with a protection device of the invention.

FIG. 1 shows a seat 2 having a backrest 3 and a seat pan 4 for supporting an individual. The seat is provided with a harness 5 having a protection device 10 of the invention.

The harness 5 has a left shoulder strap 6 and a right shoulder strap 7 suitable for resting on the shoulders of an individual (not shown). The left shoulder strap 6 and the right shoulder strap 7 may be attached to the seat by retractors (not shown on FIG. 1) passing through attachment means 87 of the rotary connection type. For example, these attachment means 87 are attached to a headrest 85 of the protection device 10. Optionally, the headrest 85 may be movable in elevation to adapt to the morphology of the individual sitting on the seat.

Furthermore, the protection device 10 has a set of inflatable members folded in a breakable envelope 100. This set of inflatable members comprises in particular left inflatable lateral means arranged in the envelope 100 on the left shoulder strap 6, right inflatable lateral means arranged in the envelope 100 on the right shoulder strap 7, and a neck airbag arranged in the envelope 100 and attached to the headrest 85.

Figure 2:
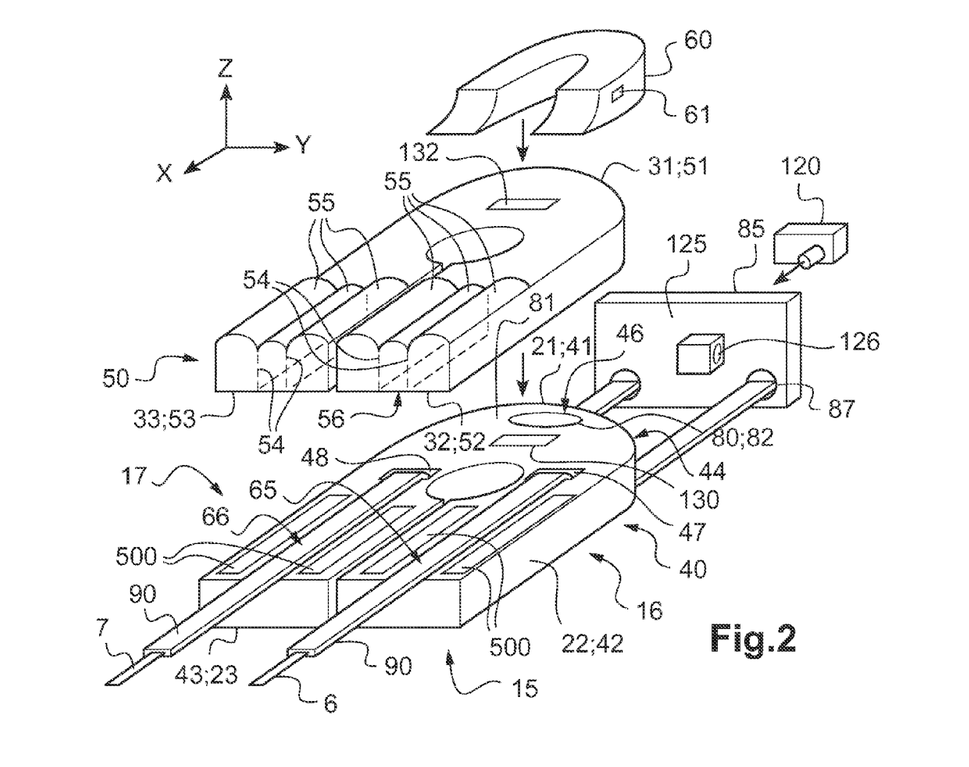
FIG. 2 is an exploded view of a protection device provided with a lower pocket and an upper pocket.

FIG. 2 is an exploded view of a protection device 10.

The set 15 of inflatable members includes an inflatable lower pocket 40. This lower pocket 40 is C-shaped, being provided with a lower base 41 forming the neck airbag 21 that is connected to the headrest 85.

Furthermore, the lower pocket 40 extends longitudinally from the lower base along two lower lateral branches 42, 43 forming respectively a left lower airbag 22 of the left inflatable lateral means 16 and a right lower airbag 23 of the right inflatable lateral means 17.

The lower base 41 is provided with an orifice 44 for engaging around a fluid distributor 125. The distributor 125 is carried by the headrest 85 and may co-operate with an inflator 120 for inflating the lower pocket.

Once inflated, the C-shape of the lower pocket 40 is almost closed, while nevertheless leaving an oblong opening through which the neck of an individual passes.

The set 15 of inflatable members also has a C-shaped inflatable upper pocket 50 provided with an upper base 51 forming a head airbag 31. The upper pocket extends longitudinally from the upper base along two upper lateral branches 52, 53 respectively forming a left upper airbag 32 of the left inflatable lateral means 16 and a right upper airbag 33 of the right inflatable lateral means 17.

In addition, each upper lateral branch 52, 53 has at least one longitudinal internal partition 54 referred to as "internal walls". Each internal wall serves to organize two adjacent "tubes" 55 in each upper airbag 32, 33.

Figure 23:
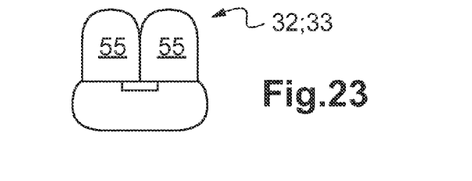
FIG. 23, a diagram showing an upper airbag provided with one internal wall.

According to the FIG. 23, one internal wall serves to organize two adjacent "tubes" 55 in each upper airbag 32, 33

According to the embodiment of the FIG. 1, each upper lateral branch 52, 53 has two longitudinal internal walls 54 to organize three adjacent "tubes" 55 in each upper airbag 32, 33.

Whatever the embodiment, the tubes of an upper lateral branch are in fluid flow communication with one another via the upper base and/or a free end of the upper lateral branch.

The upper pocket 50 is in fluid flow communication with the lower pocket 40, e.g. via a lower passage 130 of the lower base 41 communication with an upper passage (not shown on the FIG. 2) of the upper base 51.

Furthermore, the upper pocket 50 is secured at least in part to the lower pocket 40.

The upper pocket 50 and the lower pocket 40 may optionally have a common wall separating them in elevation.

In the example of FIG. 2, the upper pocket 50 and the lower pocket 40 are attached to each other by stitching or the equivalent to form a common wall.

Under such circumstances, the lower pocket 40 has a lower wall 46 that is secured in part to an upper wall 56 of the upper pocket 50.

So, each upper airbag of an inflatable lateral means is secured at least in part to the lower airbag of said inflatable lateral means by at least one joint area 500. The FIG. 2 shows two joint areas 500 per inflatable lateral means. The protection device of this figure further comprises a left path 65 and a right path 66 being provided respectively between the left lower airbag 22 and the left upper airbag 32 and between the right lower airbag 23 and the right upper airbag 33 in order to enable said shoulder straps 6, 7 to pass. The left path 65 is defined between the two joint areas 500 of the left inflatable lateral means 16 and the right path 66 is defined between the two joint areas 500 of the right inflatable lateral means 17.

Furthermore, each shoulder strap runs along a corresponding inflatable lateral means between the lower airbag and the upper airbag of the inflatable lateral means.

Consequently, the protection device 10 has a left path 65 formed between the left lower airbag 22 and the left upper airbag 32, and a right path 66 arranged between the right lower airbag 23 and the right upper airbag 33 in order to said shoulder straps 6 and 7.

The lower pocket is then provided with a left slot 47 and a right slot 48 for enabling the left and right shoulder straps 6 and 7 to pass through the thickness of the pocket.

A shoulder strap thus passes between an upper airbag and a lower airbag, and then passes through the thickness of the lower pocket in order to pass under the neck airbag and reach a refractor, via a rotary connection 87, if any.

Each rotary connection 87 enables a shoulder strap to rotate relative to the seat. A rotary connection may comprise a circular stationary support and a circular movable support capable of performing rotary movement relative to each other. For example ball or roller bearing means may be interposed between the two supports. Each support then has a slot through which a shoulder strap passes.

In an alternative configuration, the connection 87 may be spherical connection allowing rotations in more than one direction.

In order to avoid friction between inflatable lateral means and a shoulder strap, the protection device 10 may include slider means for each inflatable lateral means 16, 17. The slider means are interposed between a shoulder strap and the corresponding inflatable lateral means. For example, slider means may extend between the lower pocket 40 and the upper pocket 50 so as to extend as far as a rotary connection 87 of a seat 2.

The slider means and/or the associated rotary connection may include a breakable section for separating the slider means from the seat. For example, two supports of a rotary connection may be separated from each other above a predetermined force threshold.

Figure 3:
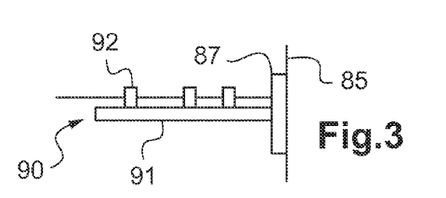
FIG. 3 is a diagram showing slide means.

With reference to FIG. 3, the slider means may comprise a base 91 carrying a plurality of guides 92 having a shoulder strap passing therethrough. Each guide may be of flattened O-shape, for example.

With reference to FIG. 2, the set 15 of inflatable members may include a C-shaped inflatable head collar 60. This head collar 60 is attached to the upper pocket so as to surround an individual's head without obstructing vision, the head collar 60 being in fluid flow communication with the upper pocket 50. For example, the upper pocket 50 has at least one passage 132 communicating with a passage of the head collar (not visible in FIG. 2).

The head collar 60 may also include a fluid pressure release valve 61.

Under such circumstances, and as a result of a crash, the inflator 120 injects fluid into the distributor 125. This fluid spreads within the lower pocket 40 via the lower base 41 and then reaches the upper pocket 50 and the head collar 60, if any.

In order to avoid an impact between the injected fluid and an individual's head, the distributor 125 may comprise a projection means 126 for projecting fluid into the lower pocket 20 in a transverse direction. Such projection means can include a casing provided with some output apertures directed along said transverse direction.

Furthermore, the lower base 41 may have a non-inflatable central zone 80 and an inflatable peripheral zone 81 of O-shape surrounding the non-inflatable zone 80 in order to channel the injected fluid.

The non-inflatable zone 80 may optionally be shut off by fabric 82.

Figure 4:
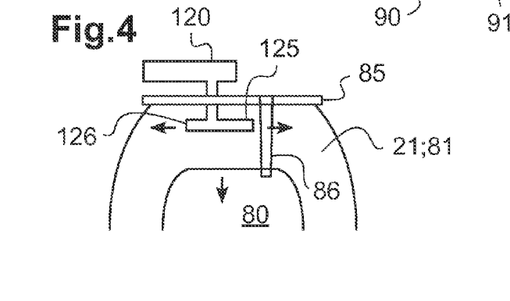
FIGS. 4 and 5 are diagrams showing a holder bar.
Figure 5:
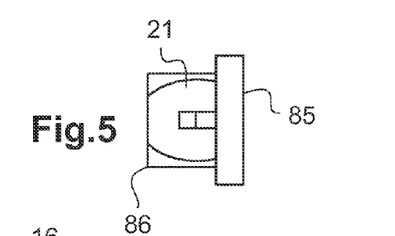

In addition, and with reference to FIGS. 4 and 5, the protection device 10 may also include a C-shaped holder bar 86 that passes through the non-inflatable zone 80 to be attached to the headrest 85 by surrounding the peripheral zone 81.

This holder bar seeks to avoid the neck airbag tearing during inflation.

Figure 6:
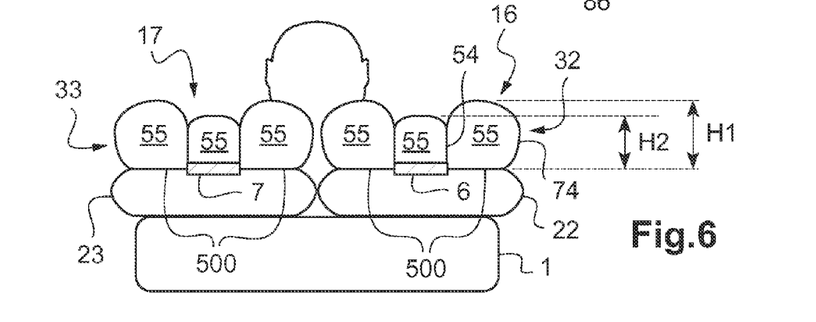
FIG. 6 is a diagram showing a lower pocket and an upper pocket when inflated.

FIG. 6 shows a protection device 10 with the set of inflatable members being inflated.

The head and the chest of the individual 1 are then held by the inflatable lateral means 16, 17. The internal walls 54 tend to avoid the lower airbag deforming as a result of the upper airbag being flattened during any lateral movement of the chest by stiffening the upper airbag.

Furthermore, each upper airbag 32, 33 may have a peripheral partition 74 of a first height H1 that is greater than a second height H2 of the internal walls 54.

Figure 7:
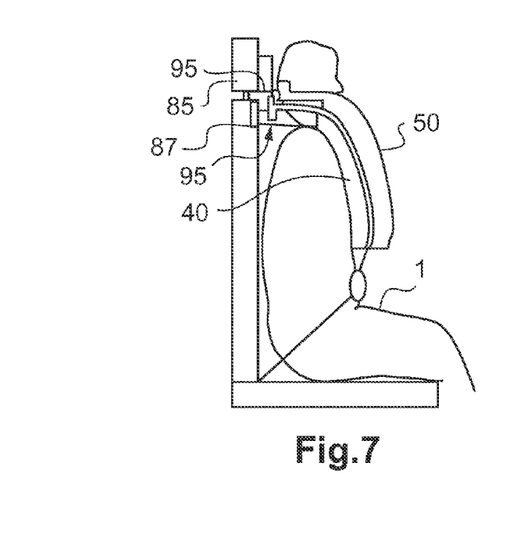
FIGS. 7 and 8 are two diagrams showing the ties connected to the inflated lower and upper pockets.

With reference to FIG. 7, inertia forces F may cause the chest of an individual 1 to move forwards.

As a result of this movement, a breakable section, and in particular a breakable section of a rotary connection 87, may break so as to allow the airbags to move with the chest. Thus, each lower airbag can remain in contact with the chest of the individual 1.

Nevertheless, the protection device may include at least one tie 95 for limiting this forward movement.

In FIG. 7, one tie 95 extends between the lower pocket 40 and the seat while another tie 95 extends between the upper pocket 50 and the headrest 85. A tie 95 may optionally extend between the upper pocket 50 and the headrest 85 while being attached in part by means of stitching to slider means.

More precisely, a tie 95 is secured to the layer of the lower pocket that is closest to the chest of the individual 1.

Figure 8:
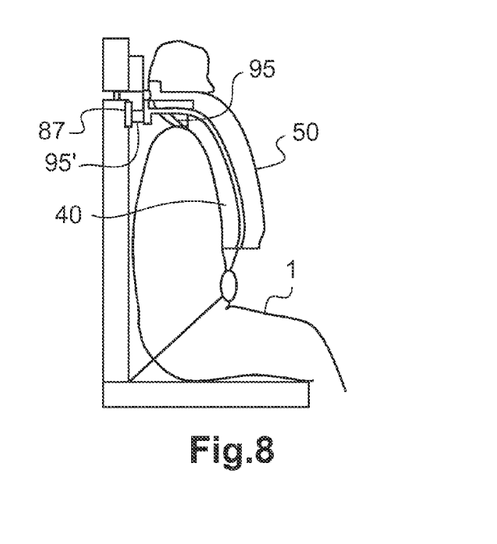

In FIG. 8, a tie 95 extends between a lower pocket or an upper pocket and slide means, a cable 95' extending between the slide means and the seat 2.

Figures 9, 10, 11, 12, 13:
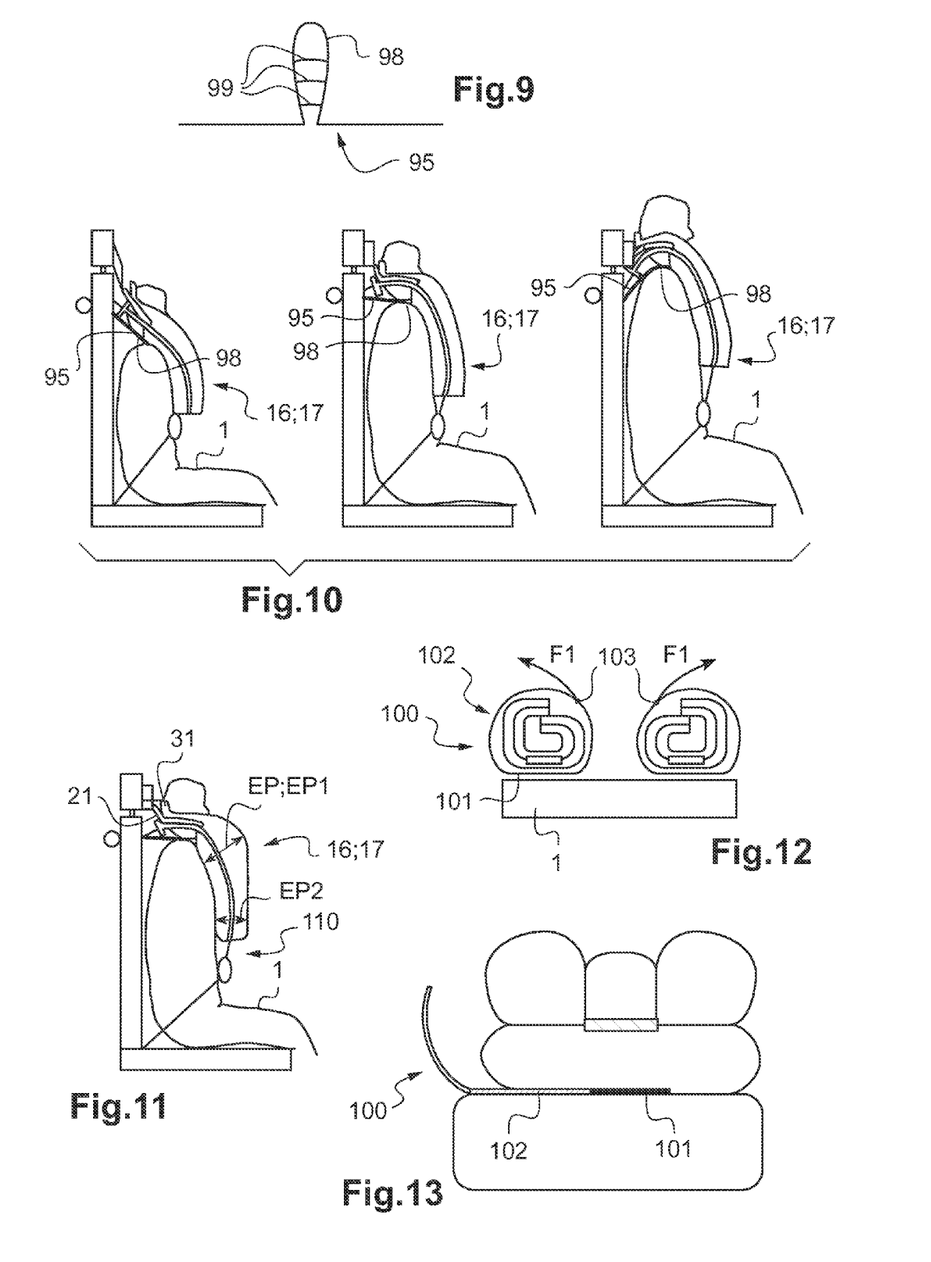
FIG. 9 shows a tie provided with a loop.
FIG. 10 comprises diagrams showing the operation of a tie provided with a loop depending on the morphology of an individual.
FIG. 11 is a diagram showing a protection device of variable thickness.
FIGS. 12 and 13 are diagrams showing an envelope of the protection device.

With reference to FIG. 9, each tie may be of variable length. Thus, a tie 95 may include a loop 98 and at least one stitching zone 99 dimensioned so as to break as from a force threshold in order to lengthen the tie 95.

For example, the tie comprises two stitching zones, one zone to adapt the length of the tie in function of the morphology of an individual, and another zone to adapt the length of the tie in function of the sustained dynamic forces to limit a possible submarining With reference to FIG. 11, the initial position of the inflatable means on an individual depends on that individual's morphology.

Under such circumstances, after a crash and after the individual has moved forwards, the length of the tie depends on that individual's morphology and on the sustained forces. This characteristic tends to encourage keeping the inflatable lateral means against the individual's chest.

With reference to FIG. 12, each inflatable lateral means 16, 17 extends longitudinally from the neck airbag 21 and the head airbag 31 towards a free end 110. Each inflatable lateral means 16, 17 may then have a thickness EP that decreases from a maximum thickness EP1 close to the neck airbag 21 and the head airbag 31 towards a minimum thickness EP2 close to the free end 110 when the lateral means are inflated.

With reference to FIG. 12, the lower and upper pockets are folded in normal conditions.

These lower and upper pockets are then arranged in an envelope 100 that is suitable for opening when they inflate. The envelope 100 may comprise two lateral sections surrounding the lateral branches of the lower and upper pockets and a root portion surrounding the bases of the lower and upper pockets.

This envelope includes a zone of weakness 103, e.g. provided with loop-and-hook closure means.

Figure 22:
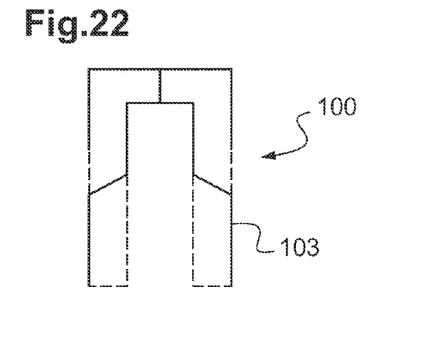
FIG. 22, a diagram showing a zone of weakness 103 of an envelope.

This zone of weakness 103 is in register with an individual's head so as to limit any risk of impact between the envelope and the individual's head during inflation. The FIG. 22 shows in dotted line the envelope 100, and in continuous line the zone of weakness 103 of said envelope according to an embodiment.

With reference to FIG. 12, the envelope may also have a lower segment 101 resting against an individual and an upper segment 102 that does not rest against the individual when the airbags are not inflated. The lower segment 101 has a surface with a low coefficient of friction, while the upper segment 102 has a surface with a high coefficient of friction that comes into contact with an individual when the airbags are inflated.

On the airbags being inflated, the zone of weakness is broken. The airbags then exert pressure on the upper segment 12 causing it to turn as shown by arrows F1.

With reference to FIG. 13, each upper segment 102 then becomes blocked between the individual 1 and a lower airbag.

Figure 14:
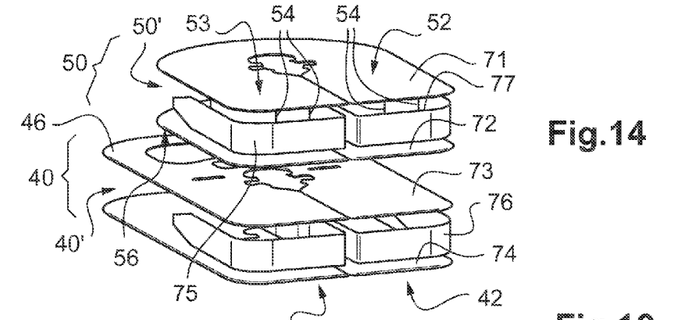
FIG. 14 is an exploded view of a set of inflatable members.

FIG. 14 is an exploded view of a set of inflatable members.

The inflatable upper pocket 50 has an inflatable upper space 50' defined in elevation by a first layer 71 above a second layer 72. In addition, this upper space 50' is defined laterally by a first partition 75 in elevation between the layers arranged in each upper lateral branch 52, 53.

Figure 15:
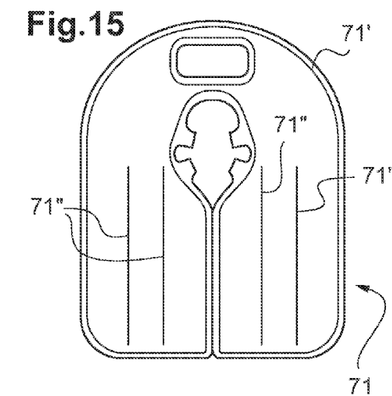
FIGS. 15 to 18 are diagrams showing the layers of said set of inflatable members.

Under such circumstances, and with reference to FIG. 15, the first layer 71 may have a peripheral line of stitching 71' and two internal lines of stitching 71" per lateral branch.

Figure 16:
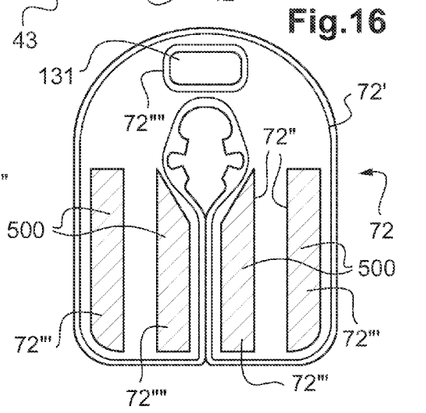

Likewise, and with reference to FIG. 16, the second layer 72 may have a peripheral line of stitching 72' and two internal lines of stitching 72" per lateral branch.

An operator can then attach the internal walls 54 by sewing them to the internal lines of stitches 71" and 72" of the first and second layers 71 and 72.

The operator may also attach the first layer 71 to the second layer 72 by sewing the peripheral line of stitching 71' of the first layer 71 to the peripheral line of stitching 72' of the second layer 72 directly and/or via a first partition 75.

Furthermore, the second layer may include internal zones of stitching 72''' for sewing to the lower pocket to define the paths for a shoulder strap and its slider means, and the joint areas 500 between the lower and upper pockets.

Finally, the second layer has an upper passage 131 for passing fluid coming from the lower pocket. The upper passage 131 may be surrounded by a zone of sealing stitching 72''. In general manner, the stitching opening on the exterior of the device are sealed.

With reference to FIG. 14, the inflatable lower pocket 40 has an inflatable lower space 40' defined by a third layer 73 above a fourth layer 74. In addition, this lower space 40' is defined on its sides by a second partition 76 in elevation between the layers arranged in each lower lateral branch 42, 43.

Figure 17:
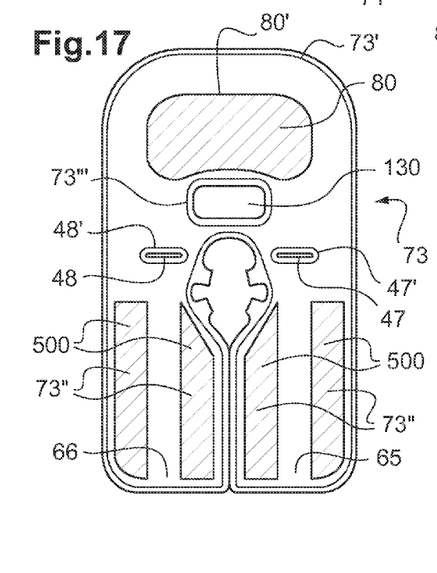

Under such circumstances, and with reference to FIG. 17, the third layer 73 may include a peripheral line of stitching 73'.

Furthermore, the third layer 73 may have internal zones of stitching 73" for stitching to the upper pocket and defining paths for a shoulder strap and its slider means, and the joint areas 500 between the lower and upper pockets.

In addition, the third layer 73 has a lower passage 130 for passing fluid coming from the lower pocket. This lower passage 130 may be surrounded by a sealing zone of stitching 73'''.

An operator can then attach the third layer 73 to the second layer 72 by sewing together their sealing zones of stitching 73''' and 72''' and their internal zones of stitching 73" and 72".

Furthermore, the third layer 73 has an opening 47, 48 for each shoulder strap. Each opening is surrounded by a line of sealing stitching 47', 48'.

Finally, the third layer 73 may define a non-inflatable zone 80 of the lower base of the lower pocket by means of a sealing line of stitching 80'. This non-inflatable zone may comprise a fabric of the third layer or it may be open.

Figure 18:
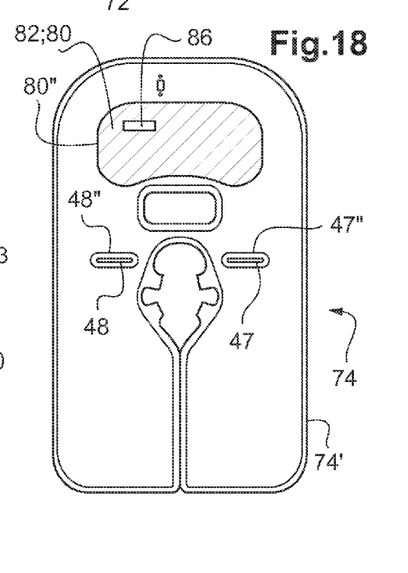

Likewise and with reference to FIG. 18, the fourth layer 74 may have a peripheral line of stitching 74' and two openings 47, 48 for each shoulder strap. Each opening is surrounded by a sealing line of stitching 47", 48".

The fourth layer 74 may also define a non-inflatable zone 80 of the lower base of the lower pocket using a sealing line of stitching 80". This non-inflatable zone 80 may comprise fabric 82. If it does, an opening 88 may be provided for passing a holder bar.

Figure 19:
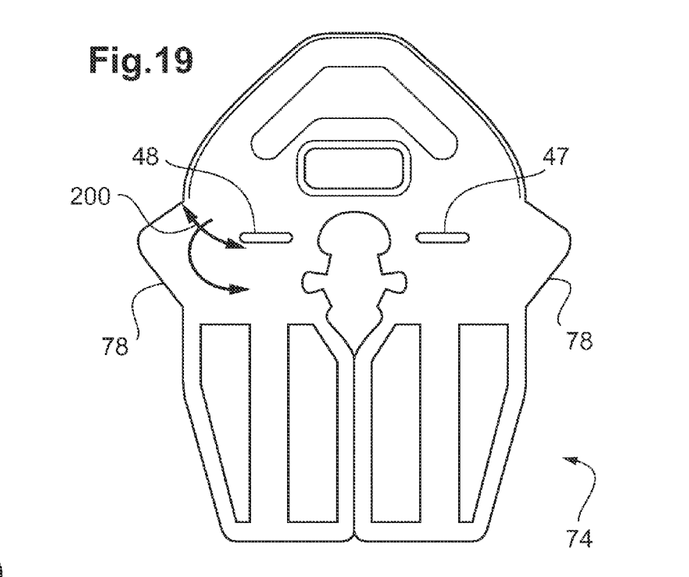
FIG. 19, a diagram showing a lower pocket including two transverse extensions.

With reference to FIG. 19, at least one lower or upper pocket may include two transverse extensions 78 from its lateral arms in order to optimize the distribution of fluid during inflation.

These projections serve to optimize the flow section 200 for fluid between the base and the lateral branches of the pocket.

Thus, the third layer 73 and the fourth layer 74 may have such projections.

Figure 20:
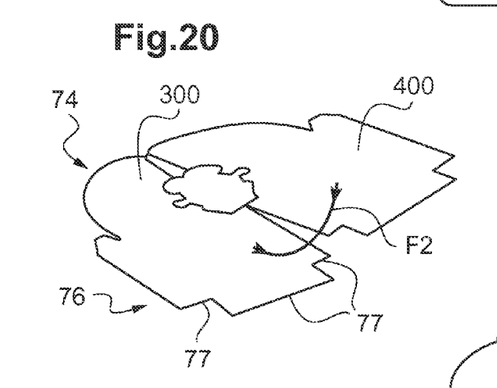
FIGS. 20 and 21 are diagrams showing a layer of a pocket provided with flanks representing a partition.
Figure 21:
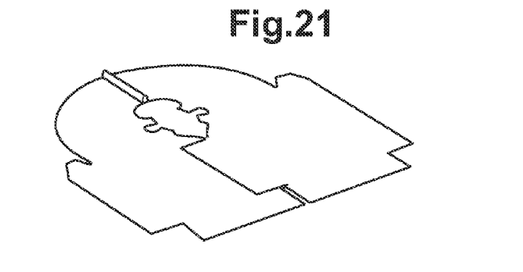

With reference to FIGS. 20 and 21, at least one of said layers 71, 72, 73, and 74 has flanks 77 forming a partition 75, 76 in elevation between layers.

For example, the fourth layer has such flanks 77 for embodying the second partitions.

As a result, the layer provided with such flanks may be obtained from two fabrics 300, 400 that are sewn together by a zone of stitching. This zone of stitching may be flared to enable the two fabrics to be moved together along arrow F2 in order to finalize the layer of FIG. 21.

For example, an operator realizes successively the following step:
- sew the lines of sealing stitching 47', 48' of the third layer 73 to the lines of sealing stitching 47", 48" of the fourth layer 77 to form the opening 47, 48,
- sew the outline of the internal zones of stitching 72''' of the second layer to the outline of the internal zones of stitching 73" of the third layer 73, and sew the internal zones of stitching 72''' of the second layer to the internal zones of stitching 73" of the third layer to form the joint areas 500,
- sew the sealing zones of stitching 72'''' of the second 72 to the sealing zones of stitching 73''' of the third layer to form a passage for passing fluid coming from the lower pocket to the upper pocket,
- sew the internal walls 54 to the second layer 72,
- sew the internal walls 54 to the first layer 71,
- sew the flanks 77 and if necessary the first layer to the second layer, and the third layer to the fourth layer.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A protection device for protecting an individual held on a seat with the help of a harness that has a left shoulder strap and a right shoulder strap, the protection device comprising:
    a set of inflatable protection members including a neck airbag and left inflatable lateral means and right inflatable lateral means, the left inflatable lateral means having a left lower airbag and a left upper airbag, the right inflatable lateral means having a right lower airbag and a right upper airbag, each upper airbag overlying a lower airbag in an elevation direction;
    a C-shaped inflatable lower pocket provided with a lower base forming the neck airbag and two lower lateral branches respectively forming the left lower airbag and the right lower airbag for positioning on a chest of the individual, the lower base including an orifice for admitting an inflation fluid; and
    a C-shaped inflatable upper pocket provided with an upper base forming a head airbag and two upper lateral branches extending longitudinally and forming respectively the left upper airbag and the right upper airbag, each upper lateral branch having at least one longitudinal internal wall so as to provide at least two tubes in each upper airbag, the upper pocket being in fluid flow communication with the lower pocket, the upper pocket being secured at least in part to the lower pocket, so that each upper airbag of an inflatable lateral means is secured at least in part to the lower airbag of the inflatable lateral means;
    wherein the lower pocket has a lower wall and the upper pocket has an upper wall, the lower wall being secured in part to the upper wall by two joint areas per inflatable lateral means, the protection device further comprising a left path and a right path being provided respectively between the left lower airbag and the left upper airbag and between the right lower airbag and the right upper airbag in order to enable the shoulder straps to pass, the left path being defined between the two joint areas of the left inflatable lateral means and the right path being defined between the two joint areas of the right inflatable lateral means.

2. The protection device according to claim 1, wherein the upper base is in fluid flow communication with the lower base.

3. The protection device according to claim 1, wherein the upper pocket and the lower pocket have a common wall separating them in elevation.

4. The protection device according to claim 1, wherein the lower pocket has a left slot in elevation and a right slot in elevation for the shoulder straps to pass through.

5. The protection device according to claim 1, wherein the lower base includes a non-inflatable central zone and an O-shaped inflatable peripheral zone surrounding the non-inflatable zone.

6. The protection device according to claim 5, wherein the non-inflatable zone is closed by a fabric.

7. The protection device according to claim 5, wherein the protection device has a headrest secured to the lower base, and the protection device includes a C-shaped holder bar crossing the non-inflatable zone and being attached to the headrest, surrounding the peripheral zone.

8. The protection device according to claim 1, wherein the protection device includes slider means for each inflatable lateral means passing at least in part between the lower pocket and the upper pocket in order to join attachment means for attaching to the seat.

9. The protection device according to claim 1, wherein the protection device includes at least one tie secured to at least one of the upper and lower pockets, the protection device including direct or indirect attachment means for attaching the tie to the seat in order to limit forward movement of the chest of the individual in contact with the protection device.

10. The protection device according to claim 9, wherein the tie includes at least one loop closed by at least one stitching zone suitable for breaking under a predetermined traction force.

11. The protection device according to claim 1, wherein each inflatable lateral means extends longitudinally from the neck airbag and the head airbag towards a free end, each inflatable lateral means having a thickness that decreases going from the neck airbag and the head airbag towards the free end when the lateral means are inflated.

12. The protection device according to claim 1, wherein the upper airbag includes a peripheral partition having a height greater than a height of each internal wall.

13. The protection device according to claim 1, wherein the protection device includes an inflator and a distributor, the distributor being arranged at least in part in the lower base, the distributor including a projecting means for projecting fluid into the lower base along a transverse direction.

14. The protection device according to claim 1, wherein the set of inflatable protection members is folded inside an envelope having a zone of weakness to enable the inflatable protection members to be deployed, the envelope having a lower segment configured to rest on the individual, and an upper segment configured to not rest on the individual when the airbags are not inflated, the lower segment having a surface with a low coefficient of friction and the upper segment having a surface with a high coefficient of friction that is configured to come into contact with the individual when the airbags are inflated.

15. The protection device according to claim 1, wherein the set of inflatable protection members is folded inside an envelope having a zone of weakness to enable the inflatable protection members to be deployed, the zone of weakness configured to be directed towards a head of the individual so long as the airbags are not inflated.

16. A protection device for protecting an individual held on a seat with help of a harness that has a left shoulder strap and a right shoulder strap, the protection device comprising:
a set of inflatable protection members including a neck airbag and left inflatable lateral means and right inflatable lateral means, the left inflatable lateral means having a left lower airbag and a left upper airbag, the right inflatable lateral means having a right lower airbag and a right upper airbag, each upper airbag overlying a lower airbag in an elevation direction;
a C-shaped inflatable lower pocket provided with a lower base forming the neck airbag and two lower lateral branches respectively forming the left lower airbag and the right lower airbag for positioning on a chest of an individual, the lower base including an orifice for admitting an inflation fluid;
a C-shaped inflatable upper pocket provided with an upper base forming a head airbag and two upper lateral branches extending longitudinally and forming respectively the left upper airbag and the right upper airbag, each upper lateral branch having at least one longitudinal internal wall so as to provide at least two tubes in each upper airbag, the upper pocket being in fluid flow communication with the lower pocket, the upper pocket being secured at least in part to the lower pocket, so that each upper airbag of an inflatable lateral means is secured at least in part to the lower airbag of the inflatable lateral means; and
a C-shaped inflatable head collar attached to the upper pocket and configured to surround a head of the individual without obstructing vision of the individual, the head collar being in fluid flow communication with the upper pocket.

17. A protection device for protecting an individual held on a seat with the help of a harness that has a left shoulder strap and a right shoulder strap, the protection device comprising:
a set of inflatable protection members including a neck airbag and left inflatable lateral means and right inflatable lateral means, the left inflatable lateral means having a left lower airbag and a left upper airbag, the right inflatable lateral means having a right lower airbag and a right upper airbag, each upper airbag overlying a lower airbag in an elevation direction;
a C-shaped inflatable lower pocket provided with a lower base forming the neck airbag and two lower lateral branches respectively forming the left lower airbag and the right lower airbag for positioning on a chest of an individual, the lower base including an orifice for admitting an inflation fluid;
a C-shaped inflatable upper pocket provided with an upper base forming a head airbag and two upper lateral branches extending longitudinally and forming respectively the left upper airbag and the right upper airbag, each upper lateral branch having at least one longitudinal internal wall so as to provide at least two tubes in each upper airbag, the upper pocket being in fluid flow communication with the lower pocket, the upper pocket being secured at least in part to the lower pocket, so that each upper airbag of an inflatable lateral means is secured at least in part to the lower airbag of the inflatable lateral means; and
an inflatable head collar for a head of the individual, the head collar including a fluid pressure release valve.

18. The protection device according to claim 17 wherein:
the inflatable upper pocket has an inflatable upper space defined by a first layer, a second layer, and a first partition in elevation between the first and second layers for each upper lateral branch, each first partition being attached to the first layer and to the second layer, the first layer being above the second layer, each upper lateral branch having the longitudinal internal walls each attached to the first layer and to the second layer; and
the inflatable lower pocket has an inflatable lower space defined by a third layer, a fourth layer, and a second partition in elevation between the third and fourth layers for each lower lateral branch, each second partition being attached to the third layer and to the fourth layer, the third layer being above the fourth layer and being attached at least in part to the second layer.

19. The protection device according to claim 18, wherein at least one of the layers includes flanks forming a partition in elevation between layers.

20. The protection device according to claim 17 wherein at least one lower or upper pocket includes two transverse projections from its lateral arms in order to optimize the distribution of fluid during inflation.

21. An aircraft, wherein the aircraft includes the protection device according to claim 17.

22. The protection device according to claim 17 wherein the head collar is C-shaped and is attached to the upper pocket, and wherein the head collar is configured to surround the head of the individual without obstructing vision of the individual, the head collar being in fluid flow communication with the upper pocket.

* * * * *